US007864756B2

(12) United States Patent
Enzmann et al.

(10) Patent No.: US 7,864,756 B2
(45) Date of Patent: *Jan. 4, 2011

(54) SYSTEMS AND METHODS FOR PROVIDING A NETWORK CONVERSION INTERFACE (75) Inventors: Mark Enzmann, Blairsville, GA (US); Roger Mahler, Marietta, GA (US)

(73) Assignee: Shoretel, Inc., Sunnyvale, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 12/175,895

(22) Filed: Jul. 18, 2008

(65) Prior Publication Data
US 2008/0317063 A1 Dec. 25, 2008

Related U.S. Application Data (63) Continuation of application No. 10/339,883, filed on Jan. 11, 2003, now Pat. No. 7,417,979.

(51) Int. Cl.
H04L 12/66 (2006.01)
(52) U.S. Cl. .................. 370/356; 370/354; 370/466
(58) Field of Classification Search ............ 370/356, 370/352, 354, 465, 466, 389, 401
See application file for complete search history.

(56) References Cited

U.S. PATENT DOCUMENTS

| 4,982,175 | A | | 1/1991 | Streater | |
|---|---|---|---|---|---|
| 5,029,202 | A | * | 7/1991 | Doernbach et al. | 379/207.16 |
| 5,475,691 | A | * | 12/1995 | Chapman et al. | 370/527 |
| 6,856,614 | B1 | * | 2/2005 | Sun | 370/352 |
| 6,934,382 | B1 | * | 8/2005 | Kunisch | 379/377 |
| 7,010,002 | B2 | | 3/2006 | Chow et al. | |
| 7,116,762 | B2 | | 10/2006 | Bennett et al. | |
| 7,187,694 | B1 | | 3/2007 | Liao | |
| 2001/0012293 | A1 | * | 8/2001 | Petersen et al. | 370/389 |
| 2002/0176567 | A1 | | 11/2002 | Chen et al. | |
| 2003/0214939 | A1 | * | 11/2003 | Eldumiati et al. | 370/352 |

OTHER PUBLICATIONS

"Shoreline4 Planning and Installation Guide," Release 1.0, Chapter 5 entitled "Trunk Planning and Ordering" in its entirety (20 pages), published Sep. 20, 2002.
Entire prosecution history of U.S. Appl. No. 10/339,883, filed Jan. 11, 2003 by Enzmann et al, issued as U.S. Appl. No. Patent 7,417,979.

* cited by examiner

Primary Examiner—Jayanti K Patel
Assistant Examiner—Jung Park
(74) Attorney, Agent, or Firm—Silicon Valley Patent Group LLP; Omkar Suryadevara (57) ABSTRACT Systems and methods are provided wherein an incoming plain old telephone systems (PSTN) signal is input into a network conversion interface. The network conversion interface first determines the data type of the incoming signal. Next, the network conversion interface creates a routing sequence of the incoming signal based on the determined data type. Finally, the network conversion interface converts the incoming signal into an 802.X format and sends the signal to an appropriate IP device based on the determined signal type. Should the network conversion interface lose electrical power, a drop contactor routes the incoming signal directly to an analog device without creating a routing sequence or performing an 802.X conversion.

24 Claims, 9 Drawing Sheets

SYSTEMS AND METHODS FOR PROVIDING A NETWORK CONVERSION INTERFACE

CROSS REFERENCE TO RELATED APPLICATIONS

This application is a continuation of U.S. application Ser. No. 10/339,883 filed Jan. 11, 2003, now issued as U.S. Pat. No. 7,417,979, the entirety of which is incorporated herein by reference.

BACKGROUND OF THE INVENTION

1. Field of the Invention

This invention relates to a system for providing a home network conversion interface. More particularly, this invention relates to converting a Public Switched Telephone Network (PSTN) to an 802-type signal (i.e., 802.X) for use by the PSTN home network.

2. Description of Related Art

A large number of telephone service companies use analog Public Switched Telephone Network (PSTN) when routing ordinary voice telephone calls on its network. PSTN is often delivered over a subscriber loop of copper wires installed between each subscriber and a local telephone company's (telco) central office. The telco central office contains circuit switches that interconnect subscribers and establish call connections. Typically, a circuit connection is established for each telephone call and this connection is maintained for the duration of a call.

A PSTN based arrangement provides the advantage that existing telephone wiring coming to a home may be used to implement a home network environment. However, telephone lines inside the home are inherently noisy due to ambient noise caused by electrical devices in the home, for example dimmer switches, transformers of home appliances, etc. In addition, twisted pair telephone cable lines used in PSTN systems suffer from turn-on transients due to on-hook and off-hook and noise pulses from the standard PSTN telephones, and electrical systems such as heating and air-conditioning systems, etc.

Because of the increased use of computers and wireless devices inside businesses and homes, an increased load and interference on standard telephone networks has become apparent. Thus, average modern home networks suffer slow data rates and now would benefit from an 802-type compatible data line in order to effectively and efficiently manage a home-based local area network. Accordingly, many homes have installed the more stable and technology friendly 802-type lines and devices for home computing and use. The 802-type signal lines are robust enough that they are not affected by ambient conditions. However, due to income or local telco line restrictions, many homes cannot be provided such features. For example, many rural areas have not been provided with 802-type signal lines due to lack of demand or cost effectiveness.

Local area networks use a network cable or other media to link stations on the network. Each local area network uses a media access control (MAC) enabling network interface cards at each station to share access to the media. Conventional local area network architectures use a media access controller operating according to half-duplex or full duplex Ethernet (ANSI/IEEE standard 802.3) protocol using a prescribed network medium, such as 10 BaseT.

Conventional PSTN telephone system lines entering a home require that the home be wired with PSTN compatible devices. Just as conventional PSTN lines, conventional incoming 802-type system lines require that Ethernet-type devices be available for the incoming 802-type signal.

Accordingly, there is a need to provide all homes with a low cost home network interface that is capable of receiving an analog PSTN signal while the home network operates with 802-type (802.X) signals. Particularly, homes in rural areas without 802-type supply lines would greatly benefit from such features. Thus, due to the problems associated with PSTN inside the home, it would be advantageous to allow the incoming PSTN signal to be converted to be an 802-type (802.X) signal.

SUMMARY OF THE INVENTION

As outlined above, conventional systems have not recognized or provided a system that is capable of providing 802-type services to a home or business that has only PSTN type signal lines incoming. Accordingly, it is an object of the present invention to provide a portable network interface device capable of translating an incoming PSTN signal into a signal recognizable by 802-type devices.

This invention provides systems and methods for providing Ethernet type services on a conventional incoming PSTN system by converting an incoming PSTN signal into an 802-type signal.

This invention provides systems and methods for interfacing an incoming PSTN/ISDN lines with an 802.X system thus, allowing change of transport to 802.X Ethernet transport.

This invention further provides systems and methods for forwarding an incoming PSTN/ISDN call to an 802.X-type device or computer terminal.

This invention additionally provides systems and methods for recognizing the type of incoming PSTN signal and translating the recognized format into the appropriate 802.X format.

This invention also provides systems and methods perform 802.X packet building and construction from incoming PSTN signals.

In various exemplary embodiments according to this invention, an incoming PSTN signal is converted to an 802-type (802.X) signal for use by 802.X-type devices interconnected in a network that receives the incoming PSTN signal. The converted signal is constructed in a packet format compliant to each of the connected 802.X-type devices.

In various exemplary embodiments according to this invention, the incoming signal is routed to a device according to a pre-selected routing sequence. The incoming signal is converted to an appropriate protocol according to the devices present in the routing sequence.

In various exemplary embodiments according to this invention, the system first receives a PSTN signal, then a sends a ring signal to all connected devices. If a connected device goes off-hook during transmission of the ring signal, the PSTN signal is converted to an appropriate signal for the off-hook device. The system finally transmits the converted signal to the off-hook device.

In various exemplary embodiments according to this invention, an incoming PSTN call can be sent to a PSTN or an 802.X device depending on the pre-selected routing sequence.

These and other features and advantages of this invention are described in or apparent from the following detailed description of the apparatus/systems and method according to this invention.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION OF EXEMPLARY EMBODIMENTS

The exemplary embodiments of the systems and methods according to this invention employ a conversion technique that can selectively convert an incoming PSTN signal into an 802.X packet based signal based on a predetermined routing sequence of the incoming signal. The exemplary embodiments can also convert the incoming PSTN signal based on a predetermined type of device placed off-hook in response to a global ring signal. In the exemplary embodiments, the incoming PSTN signal can be converted to any 802.X packet format needed by devices interconnected in a home network environment.

Figure 1:
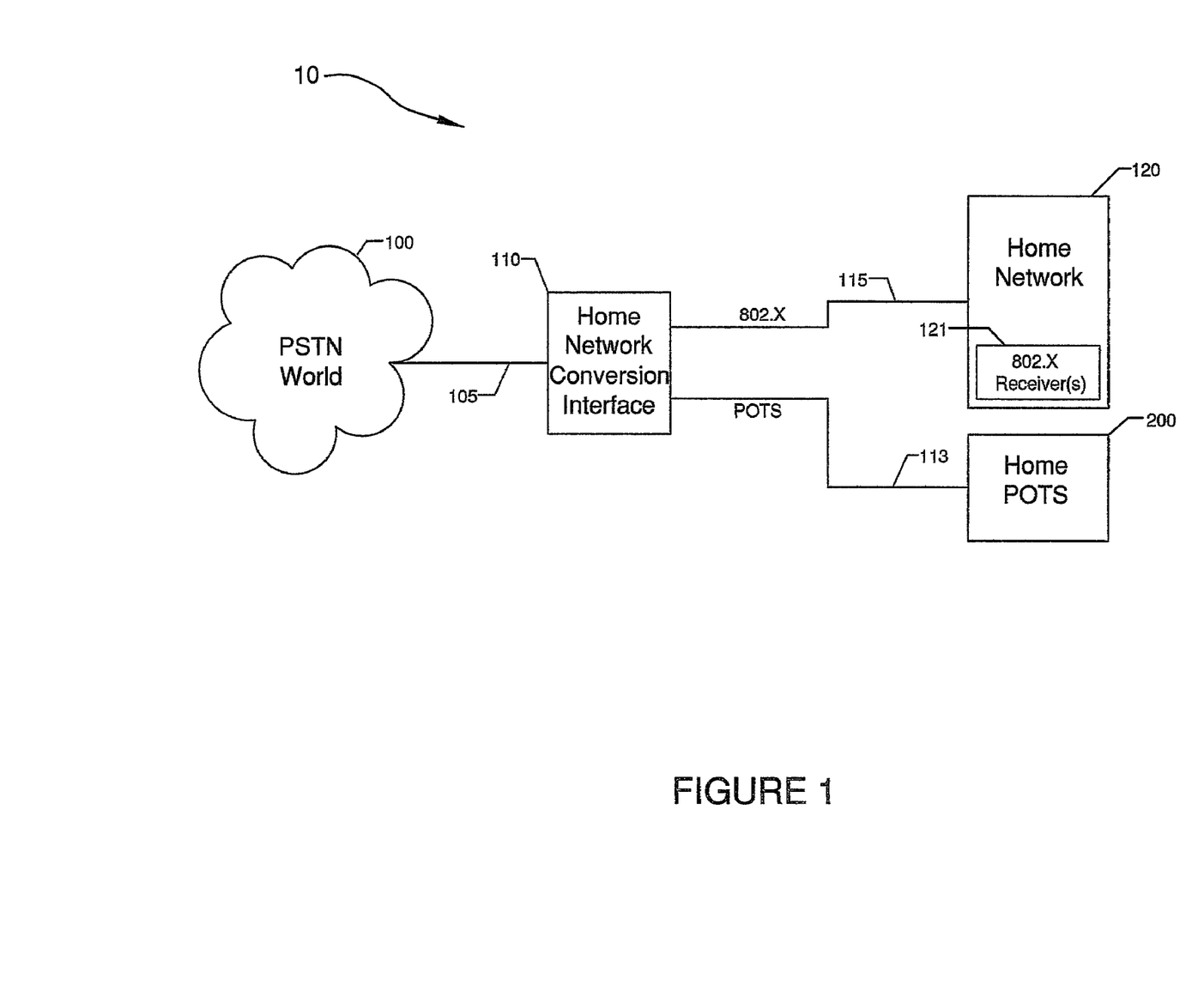
FIG. 1 shows an exemplary block diagram of an embodiment of the home network conversion system according to this invention.

FIG. 1 illustrates the basic concept of a home network conversion system 10 according to this invention. As shown in FIG. 1, the PSTN world 100 is connected to a home network conversion interface 110 via PSTN signal line 105. A home network 120, containing one or more 802.X receivers 121, is also connected to the home network conversion interface 110 via 802.X signal line 115. Also connected to the home network conversion interface 110 is a home POTS (Plain Old Telephone) system 200 via POTS signal line 113. It should be appreciated that the PSTN world 100 can be any system or device containing conventional PSTN devices and connections.

In operation, an incoming signal from the PSTN world 100 enters the home network conversion interface 110, is converted from a PSTN signal to an 802.X signal, and is forwarded to the home network 120 along 802.X signal line 115. The configuration of the present invention allows a user to transfer an analog PSTN signal to any 802.X capable receiver that is accessible on the home network 120. A system using this configuration is made much more robust. Additionally, many features are added to the user that are not available in a system that consists of only PSTN devices. For example, many personal digital assistants (PDA), with little modification, could be made to accept a PSTN based telephone call, once the call is converted to an 802.X format.

The signal lines 105 and 115 can be any known or later-developed device or system usable to connect the PSTN world 100 and the home network 120 to the home network conversion system 110, including, but is not limited to a direct cable connection, a connection over a wide area network or a local network, a connection over an intranet or a connection over an extranet, a connection over the Internet, or a connection over any other distributed processing network or system. In general, the links 105 and 115 can be any appropriate known or later-developed connection system or structure capable of transporting PSTN and 802.X signals.

It should be appreciated that the home network 120 can be any 802.X-based home computing environment capable of utilizing 802.X-based information. It should also be appreciated that the 802.X receivers 121 can be any device or devices capable of receiving 802.X-based packet information.

Figure 2:
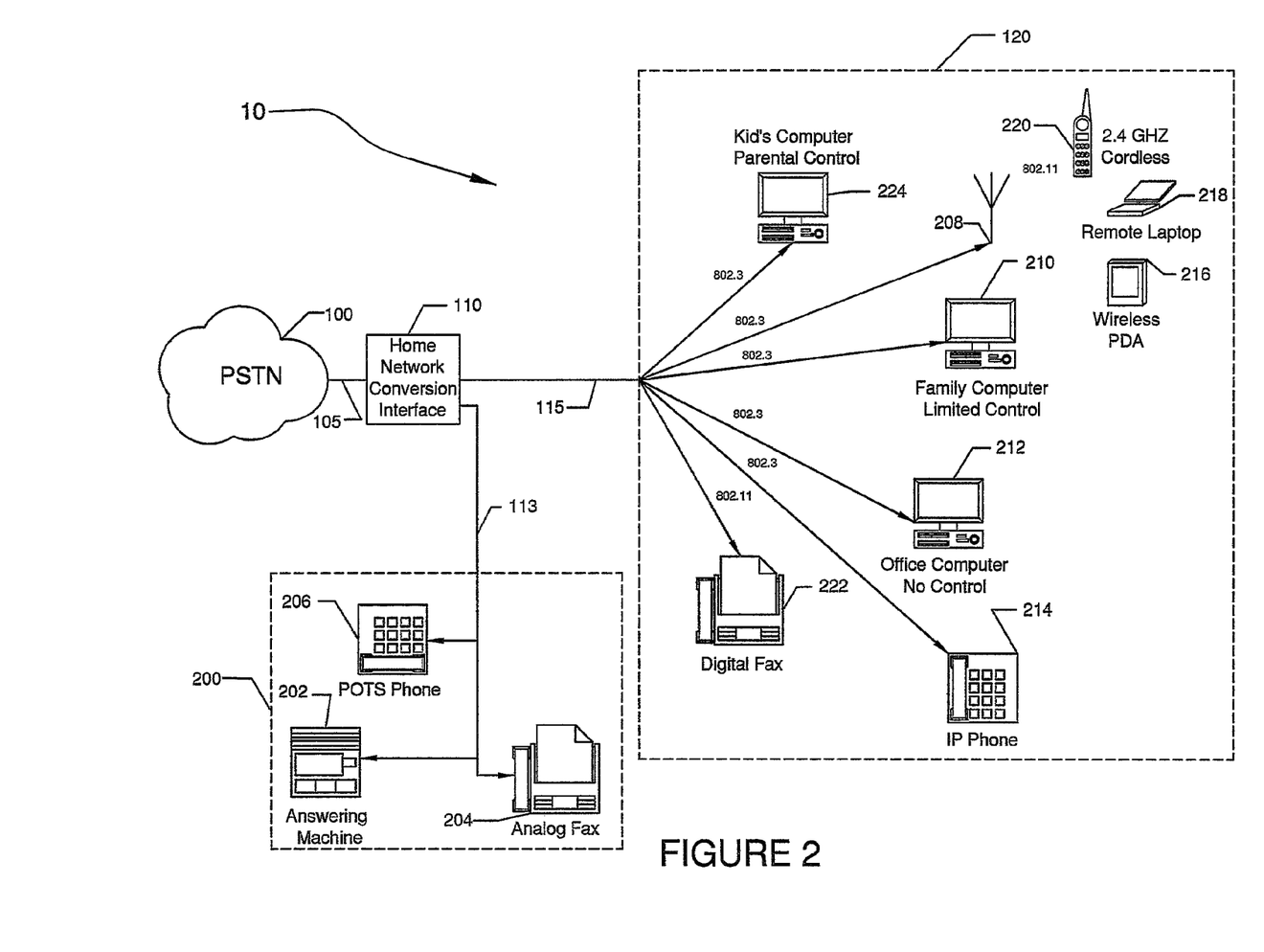
FIG. 2 illustrates exemplary device components connected to the home network conversion interface according to an embodiment of this invention.

FIG. 2 illustrates a more detailed representation of the home network conversion system 10. As shown in FIG. 2, the PSTN world 100 is connected to the home network conversion interface 110 through PSTN signal line 105. Also connected to the home network conversion interface 110 is the home network 120 consisting of 802.3 receivers 208, 210, 212, 214, 216, 218, 220, 222, and 224. As one can see from this figure, each of the 802.3 receivers 208, 210, 212, 214, 216, 218, 220, 222, and 224 use different 802.X protocol types. The 802.3 receivers 210, 212, 214, and 224 can be connected directly to the home network conversion interface 110 or wirelessly connected using a remote transmitter 208 and receivers 216, 218 and 220. In addition, analog receivers 200 can be connected to the home network conversion interface 110 via PSTN signal line 113. The analog receivers 200 can include, for example, a POTS phone 206, an answering machine 202 and an analog fax 204. These devices can utilize the incoming PSTN signal after entry into the home network conversion interface 110, but before conversion to an 802.X format.

FIG. 2 illustrates a "star" shaped connecting structure. However, it should be appreciated that any now known or later developed home network connecting structure can be used without departing from the scope of this invention. For example, a token-ring type configuration can be implemented.

In a first mode of operation, the home network conversion interface 110 can be programmed to receive a PSTN signal and based on a predetermined routing pattern and the type of incoming signal. Based on the type of incoming signal, the home network conversion interface 110 can determine whether to route the incoming signal to an analog receiver or to an 802.X receiver. Once the decision is made as to what device type to route the signal, a ring sequence can be implemented to reach the dialed party. For example, if the call is going to an 802.X receiver, the home network conversion interface 110 can first ring the IP Phone 214. If the dialed party cannot be reached at the IP Phone, the home network conversion interface 110 can then ring the wireless PDA 216. Once a customer is located and the receiving device goes off-hook, the incoming PSTN signal can be routed to an analog device or converted into the appropriate 802.X format for the device that has gone off-hook. The appropriate 802.X conversion format is determined by the device type that has gone off-hook.

In a second mode of operation, the home network conversion interface 110 can be programmed to ring all devices connected to the home network conversion interface 110.

When a device goes off-hook, the incoming PSTN signal can be converted into the appropriate signal depending on the requirements of the off-hook device.

Figure 3:
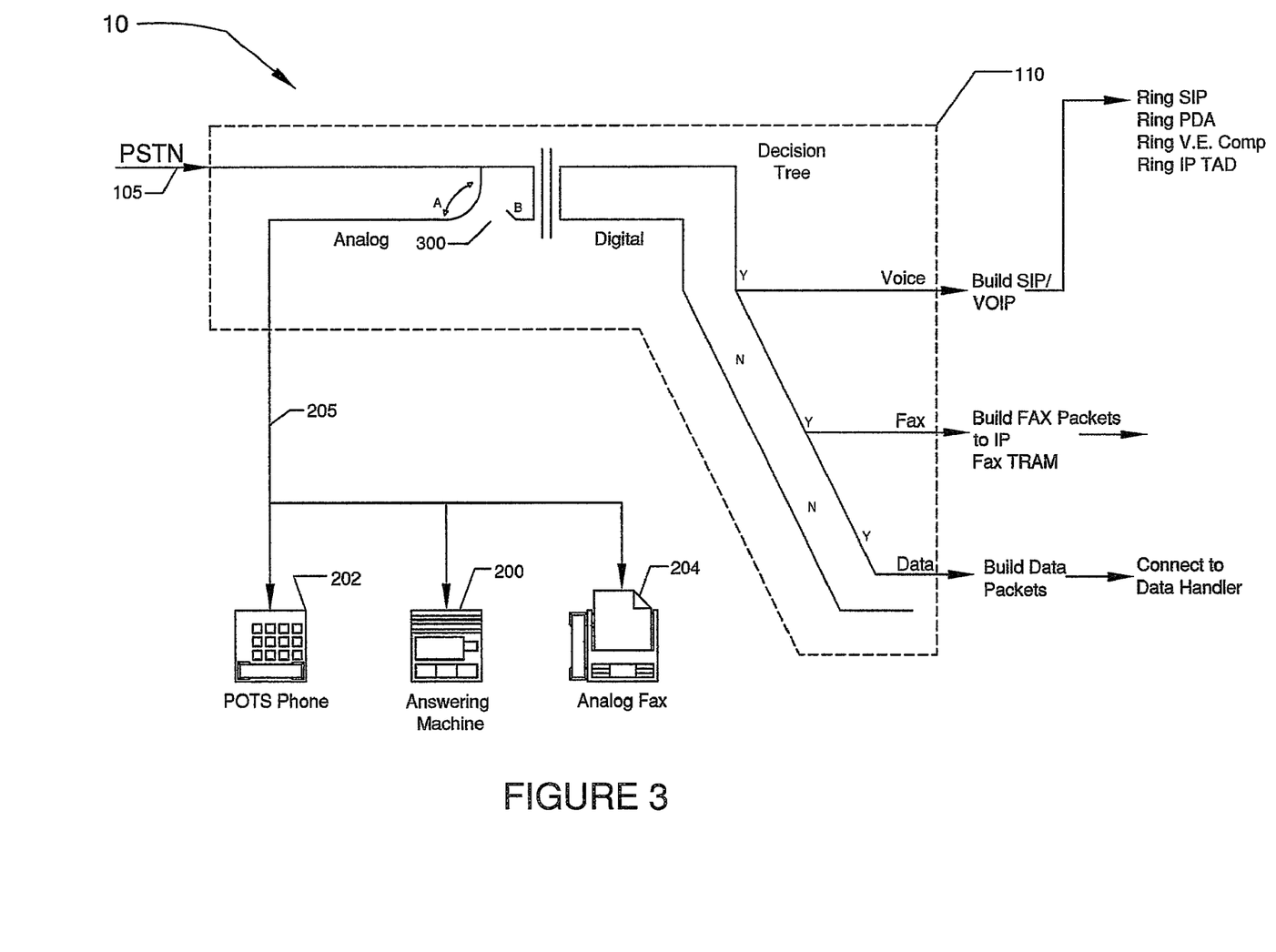
FIG. 3 illustrates a first exemplary decision process associated with signal processing used in the home network conversion system according to FIG. 1.

FIG. 3 illustrates an exemplary representation of the processes associated with converting an incoming PSTN signal into an 802.X-type signal in a home network conversion system 10 according to a first exemplary embodiment. As one can see from FIG. 3, a PSTN signal enters the home network conversion interface 110 from the signal line 105. The PSTN signal is routed to the appropriate signal type based on the position of the drop contactor 300. The position of the drop contactor is set according to settings stored in memory. The memory settings are predetermined by a user of the system. These settings also indicate the ring sequence desired by the user. In this embodiment, the drop contactor 300 is shown in FIG. 3 is set to position A so that the PSTN signal is passed to the analog devices 200, 202 and 204 over PSTN signal line 205. Thus, the incoming signal will be routed to analog devices. However, if, based on the user preferences, the drop contactor 300 is in position B, the type of incoming signal is determined by the home network conversion interface 110 and the appropriate device types are initialized in accordance with the preprogrammed routing sequence. For example, if the incoming signal is determined to be a voice signal, the home network conversion interface 110 can build Session Initiated Protocol (SIP) packets, which is the standard format for voice packets. If the incoming signal is a fax signal, then the home network conversion interface 110 can build fax packets to send the packets to the fax device. This process is repeated for each type of incoming signal.

Figure 4:
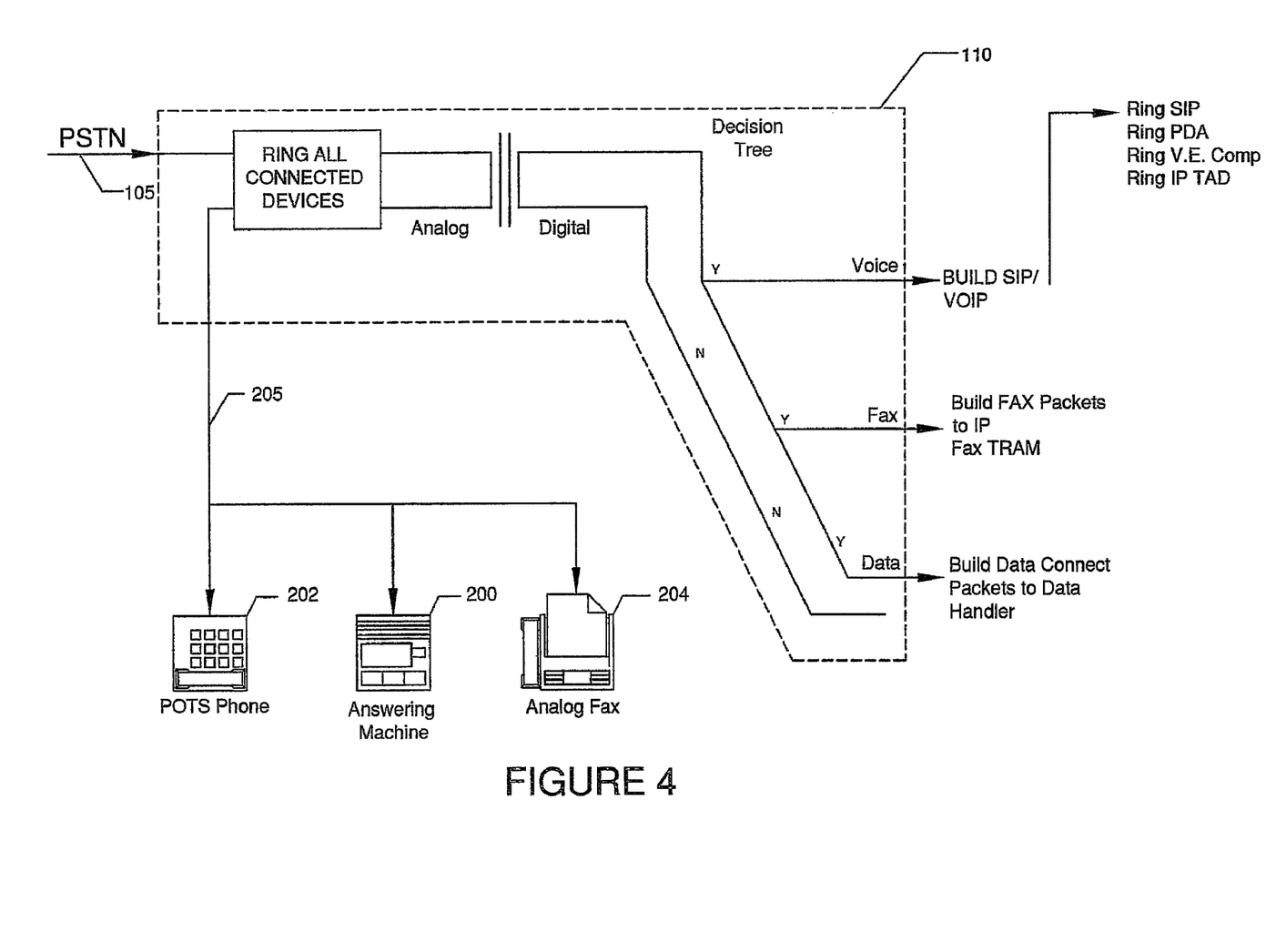
FIG. 4 illustrates a second exemplary decision process associated with signal processing used in the home network conversion system according to FIG. 1.

FIG. 4 illustrates a second exemplary embodiment of the processes associated with converting an incoming PSTN signal into an 802.X-type signal in home network conversion system 10. In this embodiment, a PSTN signal enters the home network conversion interface 110. The home network conversion interface 110 then rings all connected devices, analog and digital. Once the user places a connected device off-hook, the home network conversion interface determines what type of device has gone off-hook and performs the appropriate conversion depending on the required format of the off-hook device. The analog to Digital conversion is performed only if a digital device has gone off-hook.

Figure 5:
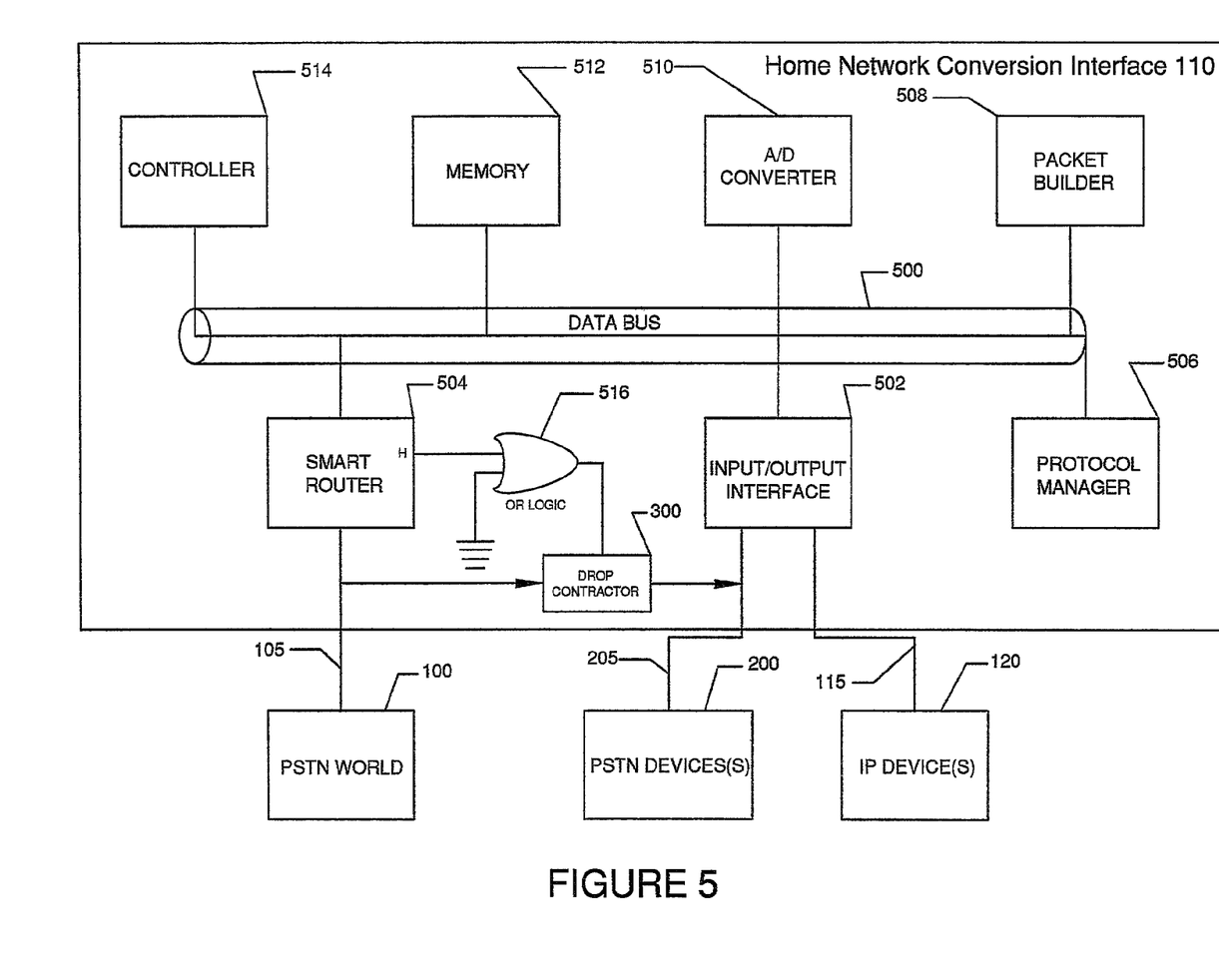
FIG. 5 illustrates an exemplary embodiment of a home network conversion interface according to this invention.

FIG. 5 illustrates one exemplary embodiment of a home network conversion interface 110 according to this invention. As shown in FIG. 5, the home network conversion interface 110 includes an input/output interface 502, a controller 514, a memory 512, a packet builder 508, a protocol manager 506, an Analog to Digital (A/D) converter 510 and a smart router 504, each interconnected by one or more data/control busses 500. Also connected between signal lines 105 and 205, is a drop contactor 300. Connected between the smart router 504 and the drop contactor 300 is logic circuit 516. As further shown in FIG. 5, the PSTN world 100 is connected to the smart router 504 via PSTN signal line 105. Additionally, one or more PSTN devices 200 are connected over at least one link 205 to the input/output interface 502, as are one or more Internet Protocol (IP) devices 120 over at least one link 115.

It should be understood that each of the circuits or routines shown in FIG. 5 could be implemented as portions of a suitably programmed general-purpose computer. Alternatively, each of the circuits or routines in FIG. 5 could be implemented as physically distinct hardware circuits within an ASIC, or using a FPGA, a PDL, a PLA or a PAL, a digital signal processor, or using discrete logic elements or discrete circuit elements. The particular form of each of the circuits or routines shown in FIG. 5 will take is a design choice and will be obvious and predicable to those skilled in the art.

Each of the links 105, 205, and 115 can be implemented using any known or later developed device or system for connecting the PSTN world 100, one or more PSTN devices 200 and IP devices 120, to the home network conversion interface 110, including a direct cable connection, a connection over a wide area network, a local network or a storage area network, a connection over an intranet, a connection over the Internet, or a connection over any other distributed processing network or system. In general, each of the links 105, 205, and 115 can be any now known or later developed connection system or structure usable to connect the PSTN world 100, one or more PSTN devices 200 and IP devices 120, to the home network conversion interface 110.

The input/output interface 502 is a bidirectional communication/data transport link between the one or more PSTN and IP devices and the home network conversion interface 110. The input/output interface 502 also routes data to one or more of the controller 514, memory 512, packet builder 508, protocol manager 506, A/D converter 510 and the smart router 504.

The memory 512 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-writable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The controller 514 can be implemented as a single special purpose integrated circuit (e.g., ASIC) having a main or central processor section for overall, system-level control, and separate sections dedicated to performing various different specific computations, functions and other processes under the control of the central processor section. The controller 514 can also be implemented as a single microprocessor circuit or a plurality of separate dedicated or programmable integrated or other electronic circuits or devices, e.g., hardwired electronic or logic circuits such as discrete element circuits or programmable logic devices. The controller 514 also preferably includes other circuitry or components, such as memory devices, relays, mechanical linkages, communications devices, etc., to affect desired control and/or input/output functions.

In a first mode of operation, the smart router 504 interprets the type of data incoming from the PSTN world 100 to determine what item in the home network conversion interface 110 the data should be sent. Once the data type has been determined, the smart router 504 then determines a routing sequence and routes the determined data to the appropriate device. The smart router 504 determines the appropriate routing sequence based on settings stored in memory 512. However, the settings may be changed and manipulated by a user through a user interface.

A PSTN signal enters the smart router 504 through the PSTN signal line 105 and the type of incoming data is determined by the smart router 504. When determining the type of incoming data, in a first determination step, the smart router 504 can employ the use of the Ring Master® technology, to Bell South, along with standard ring tones. With the Ring Master® technology, different ring signals can be assigned to particular numbers. By assigning a particular ring signal, a routing sequence can be created based on the assigned ring signal. For example, one can assign a first ring signal to an Office fax number so that only appropriate fax devices will be placed in the created ring sequence. Using this feature, much of the decision required by the smart router 504 is removed.

In a system that has, for example, multiple fax device types, a second part of the data determination step can be employed. In this second part, the tone signal of the incoming PSTN signal is recognized, so that the routing sequence can be further defined. In systems with multiple types of fax devices, by recognizing the tone of the incoming PSTN signal, the type of fax data can be determined and thus the routing sequence is better defined. For example, if in the first determination step, it has been determined that the incoming data is fax data, by further parsing the incoming data, it can be determined that the data is in a SIP, IP (Internet Protocol) or an Analog fax format.

As discussed above, the smart router 504 determines the data type of the incoming PSTN signal and calculates a routing sequence based on the data type. A user may have preselected particular PSTN signal types to go directly to the one or more of the PSTN devices 200 without further manipulation. Otherwise, under control of the controller 514, the PSTN signal is the sent to the A/D converter 510. The A/D converter 510 converts the incoming PSTN signal into a digital format. The controller 514 then transfers the digitized signal to the packet builder 508. The packet builder 508 then builds the data into the appropriate packet format based on the data type, as determined by the smart router 504. For example, if the data is determined to be voice data, the packet builder 508 will build the data received from the A/D converter 510 into an SIP (Session Initiated Protocol) format.

Once the appropriate packets are built, the protocol manager 506 checks the built format for compliance and operability with the connected one or more IP devices 120. If the packets are correctly built, the packets are sent to the appropriate one or more IP devices 120. Otherwise, the protocol manager 506 will cause the packet builder 508 to perform a rebuild of the packets to correct any errors and to ensure compliance.

It should be appreciated that the packet builder 508 contains the capacity to build any packet format needed by any of the one or more IP devices 120 connected to the home network conversion interface 110.

In a second mode of operation, once the smart router 504 receives the incoming PSTN signal, the smart router 504, under the control of controller 514, sends a ring signal to each of the connected PSTN devices 200 and IP devices 120. The user can then decide to place a device off hook depending on the proximity of the device or a personal preference. When a user places any of the rang devices off-hook, the smart router 504 detects which device was placed off-hook. Based on this detection, the smart router 504 sends the incoming signal to the packet builder 508 to build the appropriate packet format based on the off-hook device. The incoming signal is then routed to the of hook device, in the same manner as discussed above with respect to the first mode of operation.

Connected between signal lines 105 and 205 is drop contactor 300. The drop contactor 300 is also connected to the smart router 504 through the output of logic circuit 516. One input of the logic circuit 516 (OR gate) is connected to a high output of the smart router 504. The other input of the logic circuit 516 is connected to ground. Should the home network conversion interface 110 have its electrical power interrupted, the smart router 504 too will lose its electrical connection. Thus, the logic circuit 516 will output logic high to the drop contactor 300 and all signals coming in on the PSTN signal line 105 will be rerouted through the drop contactor 300 to the PSTN signal line 205 directly to the PSTN devices 200. Using this configuration, whenever the home network conversion interface 110 becomes inoperable or loses electrical power, all incoming calls are routed directly to the PSTN devices 200 through the drop contactor 300 rather than being converted and sent to the IP devices 120.

Figure 6:
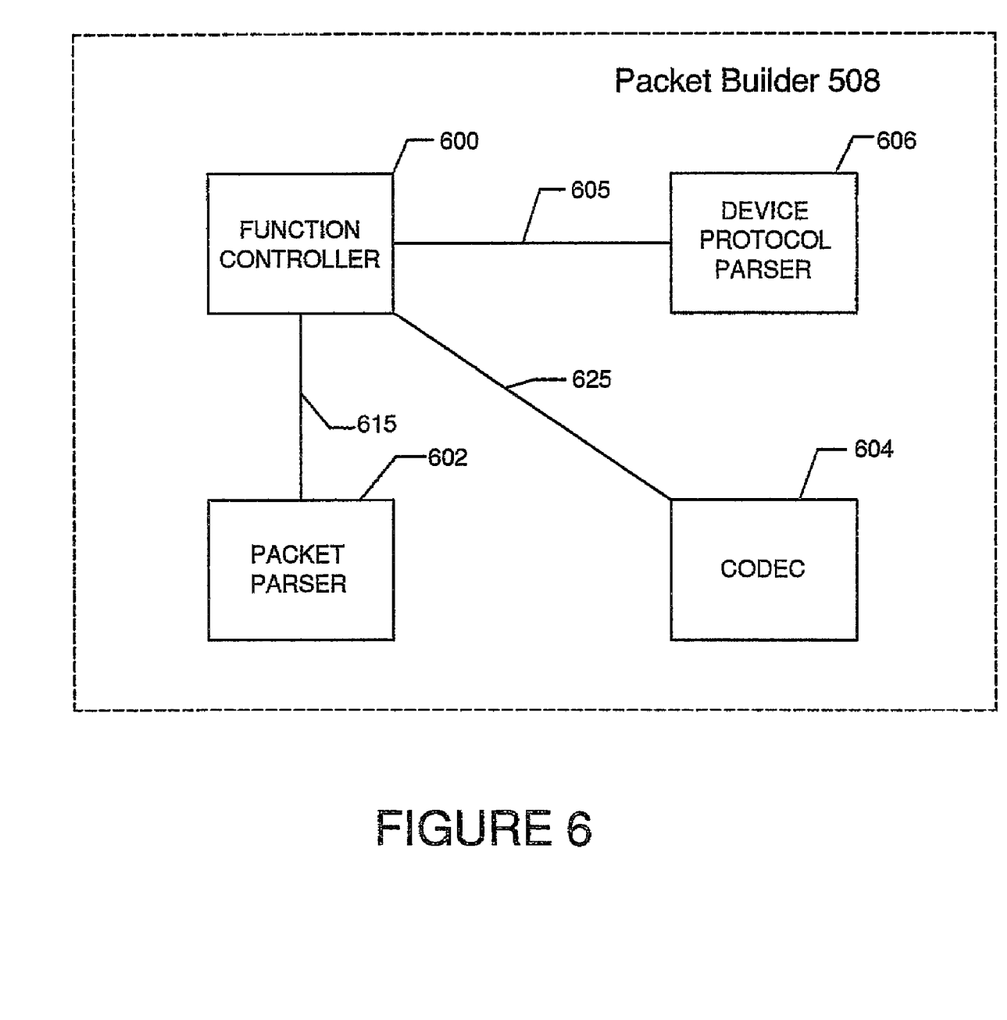
FIG. 6 illustrates an exemplary embodiment of a packet builder according to this invention.

FIG. 6 shows and exemplary embodiment of the packet builder 508, according to this invention. As shown in FIG. 6, the packet builder 508 includes a function controller 600, a packet parser 602, a CODEC 604 and a device protocol parser 606. The function controller 600 is connected to the device protocol parser 606, the CODEC 604 and the packet parser 602 by signal lines 605, 625 and 615, respectively. The function controller 600 controls and oversees all functions of the Packet builder 508.

When a signal is sent from the A/D converter 510 to the packet builder 508 so that the signal can be constructed into a packet format, the signal is first received by the CODEC 604. In the CODEC, the digitized signal is further deciphered to determine the appropriate packet format and structure necessary for the signal type determined by the smart router 504. The appropriate packet format is determined from an input from the device protocol parser 606. To get this input, the device protocol parser 606 accesses device protocol information from each connected device and from information stored in memory 512 indicating the connected devices. Once the input is received from the device protocol parser 606, under control of the function controller 600, the CODEC builds the appropriate packet signal.

Once the appropriate packet signal is built, the packet parser 602 interprets the format of the built packets and sends the resultant packet information to the protocol manager 506 to ensure compliance with the appropriate format for the connected devices. If the compliance is satisfied, the signal is sent to the appropriate device. Otherwise, the protocol manager 506 causes the packet builder 508 to reconstruct the packet signal.

It should be appreciated that the arrangement of the components in FIGS. 5 and 6 can be altered and rearranged without departing from the scope of this invention.

Figure 7:
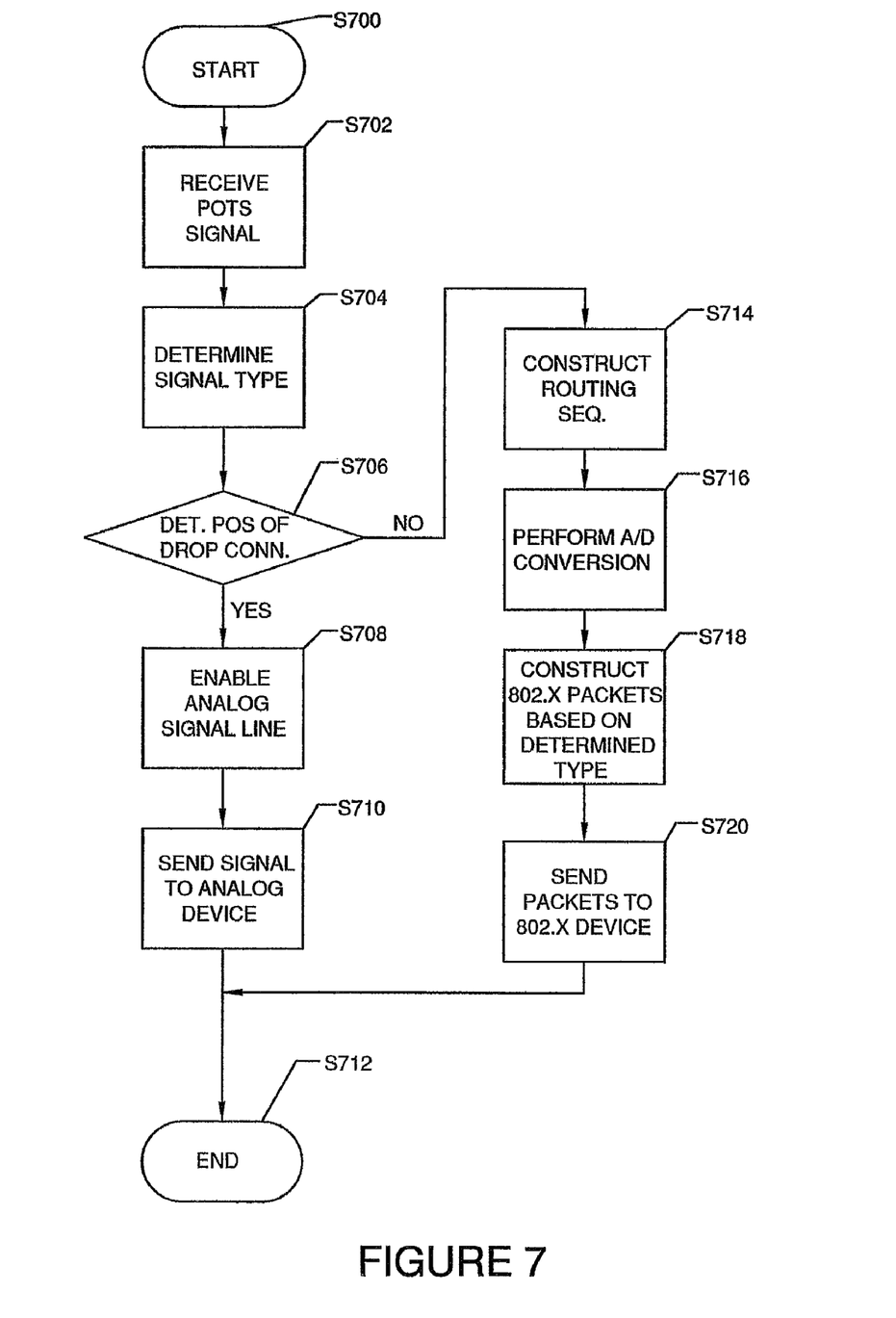
FIG. 7 is a flowchart outlining a first exemplary embodiment of a method for performing a home network conversion according to this invention.

FIG. 7 is a flowchart outlining a first mode of operation of a method for performing a home network conversion according to this invention. As shown in FIG. 7, operation of the method begins at step S700, and continues to step S702, where a PSTN signal is received. Then, in step S704, the method determines the type of signal that has been received. For example, the incoming signal can be a voice, fax or data format. Next, operation continues to step S706 where the method determines what position a drop contact between an analog and digital connection is in. If the contact is in a position to enable the PSTN signal to pass without being converted, the method continues to step S708. Otherwise, operation continues to step S714.

At step S708, the method enables an analog signal line. Once the analog signal line is enabled, the process continues to step S710. At step S710, operation sends the PSTN signal to the appropriate analog device based on the determination made in step S704.

In step S714, the method constructs a routing sequence based on a series of preset parameters or PSTN signal type. The routing sequence can indicate a series of paths the PSTN signal will take as it is being transferred from one device to another. For example, a user may want to send the signal to a wireless device first and then send the signal to a computer should the wireless device not receive the signal. Once the routing sequence is created, the operation proceeds to step S716.

At step S716, the PSTN signal is converted from an analog format to a digital format. The process then proceeds to step S718. In step S718, an 802-type packet is constructed based on the type of signal determined in step S704. In step S718, the constructed packets are checked and rechecked to ensure that the packet format complies with the devices in the routing sequence. Operation then continues to step S720. In step S720, the constructed packets are then sent to the appropriate 802.X device that complies to the format of the device sin the routing sequence. The operation finally ends at step S712.

Figure 8:
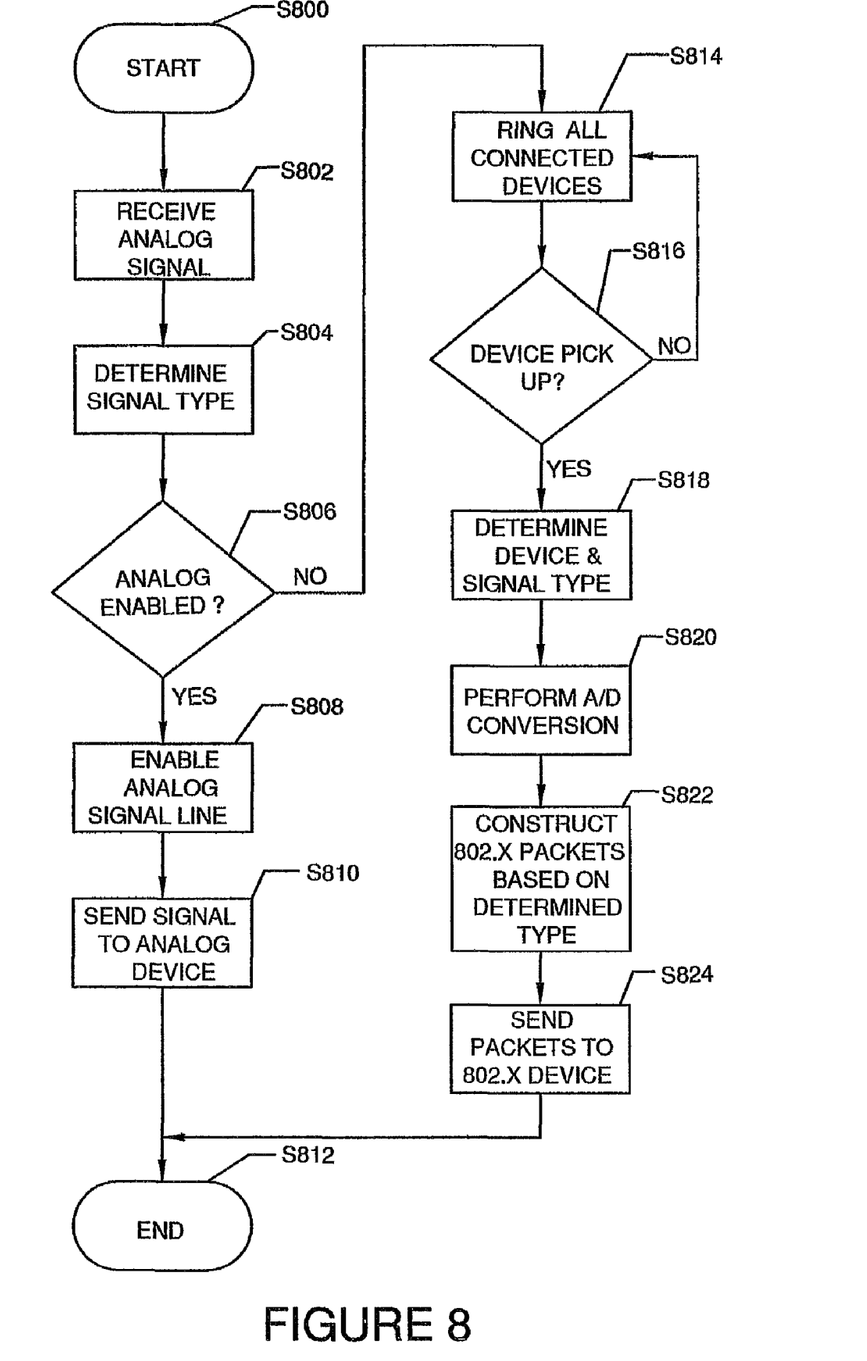
FIG. 8 is a flowchart outlining a second exemplary embodiment of a method for performing a home network conversion according to this invention.

FIG. 8 is a flowchart outlining a second mode of operation of a method for performing a home network conversion according to this invention. As shown in FIG. 8, operation of the method begins at step S800, and continues to step S802, where a PSTN signal is received. Then, in step S804, the method determines the type of signal that has been received. For example, the incoming signal can be a voice, fax or data format. Next, operation continues to step S806 where the method determines what position a drop contact between an analog and digital connection is in. If the contact is in a position to enable the PSTN signal to pass without being converted, the method continues to step S808. Otherwise, operation continues to step S814.

At step S808, the method enables an analog signal line. Once the analog signal line is enabled, the process continues to step S810. At step S810, operation sends the PSTN signal to the appropriate analog device based on the determination made in step S804.

In step S814, the method rings all devices connected to the home network. Then operation continues to step S816. At step S816, a controller monitors the home network system to determine if a device is placed off-hook. If a device is placed off-hook, then operation continues to step S818. Otherwise, operation jumps back to step S814.

In step S818, the type of device that has been placed off-hook and the type of packet format required by that device is determined. The process then continues to step S820.

At step S820, the PSTN signal is converted from an analog format to a digital format. The process then proceeds to step S822. In step S822, an 802-type packet is constructed based on the type of signal determined in steps S804 and S818. In step S822, the constructed packets are checked and rechecked to ensure that the packet format complies with the devices in the routing sequence. Operation then continues to step S824. In step S824, the constructed packets are then sent to the device that was placed off-hook. The operation finally ends at step S812.

Figure 9:
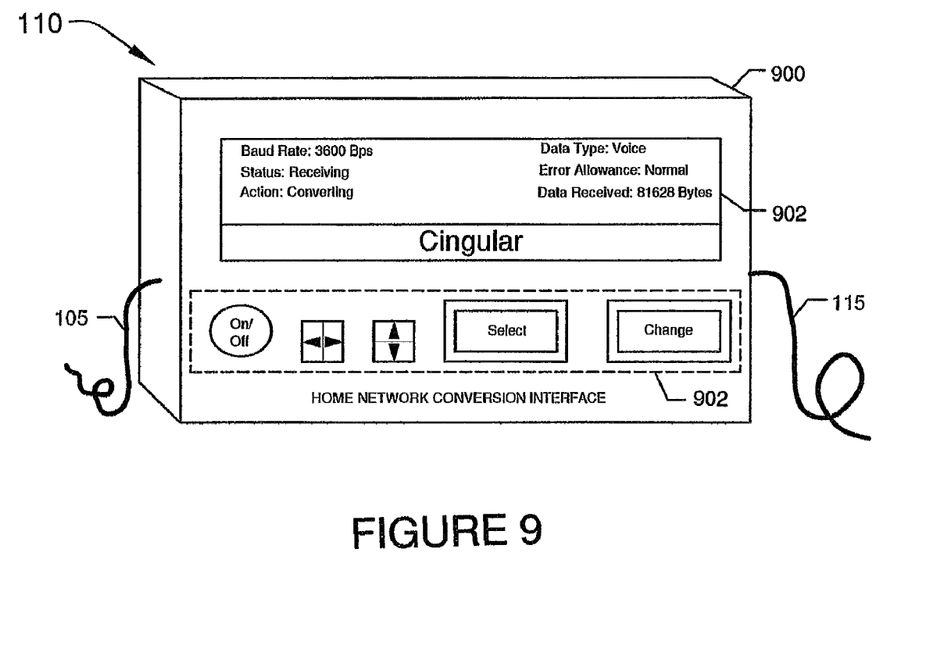
FIG. 9 shows an exemplary configuration of home network conversion interface according to the present invention.

FIG. 9 shows an exemplary representation of a portable housing for the home network conversion interface 110. As shown in FIG. 9, the home network conversion interface includes a housing 900 having an LCD display 902, a set of control buttons 904 and signal lines 105 and 115. The LCD display 902 can display information regarding the data type entering the home network conversion interface 110 and other information as shown in FIG. 9. It should be appreciated that the data shown on the LCD display can be any data related to the processes and conversion performed by the home network conversion interface 110. The set of control buttons 904 can be used to select, deselect and modify the data shown on LCD display 902.

While this invention has been described in conjunction with the exemplary embodiments outlined above, it is evident that many alternatives, modifications and variations will be apparent to those skilled in the art. Accordingly, the exemplary embodiments of the invention, as set forth above are intended to be illustrative, not limiting. Various changes may be made without departing from the spirit and the scope of the invention.

The invention claimed is:

1. A system comprising:
an input/output interface communicatively linked and in communication with a plurality of devices;
a smart router configured to:
  receive an analog signal;
  send a ring signal to each of the plurality of devices;
  detect that one of the plurality of devices has been placed in an off-hook condition;
  determine whether the off-hook device is a digital device or an analog device;
  if the off-hook device is a digital device, route the analog signal to an analog-to-digital converter; and
  if the off-hook device is an analog device, send the analog signal to the off-hook device;
the analog-to-digital converter configured to:
  receive the analog signal from the smart router;
  convert the analog signal to a digital signal; and
  send the digital signal to a packet builder;
the packet builder configured to:
  receive the digital signal from the analog-to-digital converter;
  format the digital signal into a packet-based 802.X signal; and
  send the digital signal to the smart router for routing the packet-based 802.x signal to the off-hook device.

2. The system of claim 1, further comprising a drop contactor configured to route the analog signal to any of the plurality of devices that are analog devices when a loss of electrical power is detected.

3. The system of claim 1, further comprising a protocol parser configured to assure compliance of the packet-based 802.X signal with the off-hook device.

4. The system of claim 1, wherein the analog signal is received from a Public Switched Telephone Network (PSTN).

5. A system comprising:
an input/output interface communicatively linked and in communication with a plurality of devices;
an analog-to-digital converter;
a packet builder;
a smart router configured to:
  receive an analog signal;
  determine a data type of the analog signal;
  determine which of a plurality of routing sequences to use based upon the determined data type; and
  if the data type is intended for an analog device, route the analog signal to at least one of the plurality of devices that is analog according to the determined routing sequence;
  if the data type is intended for a digital device, route the analog signal to the analog-to-digital converter according to the determined routing sequence;
the analog-to-digital converter configured to:
  receive the analog signal from the smart router;
  convert the analog signal to a digital signal; and
  send the digital signal to the packet builder;
the packet builder configured to:
  receive the digital signal from the analog-to-digital converter;
  format the digital signal into a packet-based 802.x signal; and
  send the digital signal to the smart router for routing the packet-based 802.X signal to at least one of the plurality of devices that is digital according to the determined routing sequence.

6. The system of claim 5, further comprising a memory configured to store the plurality of routing sequences.

7. The system of claim 6, wherein the smart router is further configured to determine which of a plurality of routing sequences to use, based upon the determined data type and settings stored in the memory.

8. The system of claim 5, wherein the smart router is further configured to determine the data type of the analog signal based upon standard ring tones.

9. The system of claim 5, wherein the smart router is further configured to determine the data type of the analog signal.

10. The system of claim 5, wherein the data type is one of a fax format, a data format, and a voice format.

11. The system of claim 5, wherein the analog signal is received from a Public Switched Telephone Network (PSTN).

12. The system of claim 5, wherein sending the formatted digital signal to the smart router for routing comprises sending the formatted digital signal to the at least one digital device based upon the at least one digital device being placed in an off-hook condition.

13. A method comprising:
using an input/output interface to communicate with a plurality of devices;
using a smart router to:
receive an analog signal;
send a ring signal to each of the plurality of devices;
detect that one of the plurality of devices has been placed in an off-hook condition;
determine whether the off-hook device is a digital device or an analog device;
if the off-hook device is a digital device, route the analog signal to an analog-to-digital converter; and
if the off-hook device is an analog device, send the analog signal to the off-hook device;
using an analog-to-digital converter configured to:
receive the analog signal from the smart router;
convert the analog signal to a digital signal; and
send the digital signal to a packet builder; and
using the packet builder to:
receive the digital signal from the analog-to-digital converter;
format the digital signal into a packet-based 802.X signal; and
send the digital signal to the smart router for routing the packet-based 802.x signal to the off-hook device.

14. The method of claim 13 further comprising:
when a loss of electrical power is detected, using a drop contactor to route the analog signal to any of the plurality of devices that are analog devices.

15. The method of claim 13 further comprising:
using a protocol parser to assure compliance of the packet-based 802.X signal with the off-hook device.

16. The method of claim 13 wherein:
the analog signal is received from a Public Switched Telephone Network (PSTN).

17. A method comprising:
using an input/output interface to communicate with a plurality of devices;
using a smart router to:
receive an analog signal;
determine a data type of the analog signal;
determine which of a plurality of routing sequences to use based upon the determined data type; and
if the data type is intended for an analog device, route the analog signal to at least one of the plurality of devices that is analog according to the determined routing sequence;
if the data type is intended for a digital device, route the analog signal to an analog-to-digital converter according to the determined routing sequence;
using the analog-to-digital converter to:
receive the analog signal from the smart router;
convert the analog signal to a digital signal; and
send the digital signal to a packet builder;
using the packet builder to:
receive the digital signal from the analog-to-digital converter;
format the digital signal into a packet-based 802.x signal; and
send the digital signal to the smart router for routing the packet-based 802.X signal to at least one of the plurality of devices that is digital, according to the determined routing sequence.

18. The method of claim 17 further comprising:
using a memory to store the plurality of routing sequences.

19. The method of claim 18 further comprising:
using the smart router is further to determine which of the plurality of routing sequences to use, based upon the determined data type and settings stored in the memory.

20. The method of claim 17 further comprising:
using the smart router to determine the data type of the analog signal based upon standard ring tones.

21. The method of claim 17 further comprising:
using the smart router to determine the data type of the analog signal.

22. The method of claim 17 wherein:
the data type is one of a fax format, a data format, and a voice format.

23. The method of claim 17 wherein:
the analog signal is received from a Public Switched Telephone Network (PSTN).

24. The method of claim 17 wherein:
using the smart router comprises sending the packet-based 802.X signal to the at least one digital device based upon the at least one digital device being placed in an off-hook condition.

* * * * *